Figure 1:
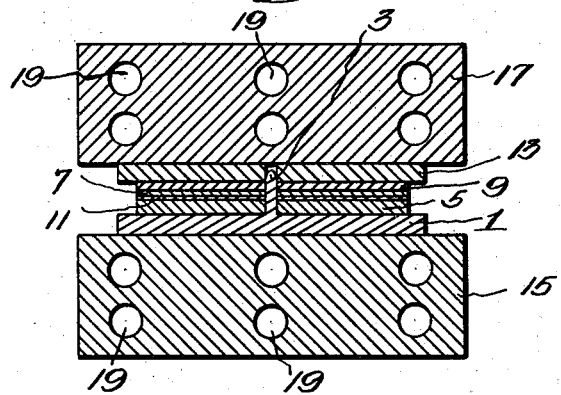

March 12, 1940.　　　J. H. HUNTER　　　2,193,099

PHONOGRAPH RECORD PRESSING MATRIX

Filed Feb. 27, 1937

Inventor

James H. Hunter

By

Attorney

Patented Mar. 12, 1940

2,193,099

UNITED STATES PATENT OFFICE 2,193,099

PHONOGRAPH RECORD PRESSING MATRIX

James H. Hunter, Lansdowne, Pa., assignor to Radio Corporation of America, a corporation of Delaware Application February 27, 1937, Serial No. 128,076

5 Claims. (Cl. 113—111)

This invention relates to phonograph record pressing matrices, and more particularly to the method of backing up such matrices to render them suitable for the pressing operation.

According to conventional practice, in forming record pressing matrices, the original wax recording is first covered with a fine powder layer of conductive material and a suitable metallic deposit is electro-plated thereon. This deposit is removed from the wax and, after being backed up by a copper or other metal backing, serves as the master matrix. To the face of the master is then applied a suitable separating medium over which another metallic layer is electro-deposited. The latter, being an exact copy of the original wax record but in more durable form, serves as a mold after it, too, has been backed up by a suitable backing. A matrix is then made from the mold, also by electro-deposition of a metallic layer thereon, and this matrix, after also being suitably backed, is employed in pressing the commercial records.

In applying the backing to the matrix, the backing plate is first heated and a thin layer of solder is applied thereto, after which the matrix shell, formed by electro-deposition to a thickness of about 1/32 of an inch, is placed against the back. Next, a pad made of several layers of blotters and cardboard is placed against the face of the matrix shell, and the assembly is subjected to pressure of about two thousand pounds to the square inch in a hydraulic press, being cooled for about fifteen minutes while in the press in order to insure hardening of the solder. The pressure applied to the matrix produces a great strain on the face thereof, and not infrequently does the grain or fibrous structure of the blotting paper actually mar the matrix. In some cases, it has also been found that the solder runs through the very minute voids or openings between the small electro-deposited metallic grains in the matrix shell, coming out onto the face thereof and sticking between the grooves. The foregoing, of course, results in damage to the face of the matrix, and records pressed thereby are characterized by more or less distortion.

The primary object of my present invention is to provide an improved pad for use during the backing up operation which will avoid causing the matrix to be damaged in the manner previously set forth.

More specifically, it is an object of my present invention to provide an improved pad as aforesaid which will not itself impress any markings on the face of the matrix, and which will, at the same time, prevent the solder from running through to the face of the matrix shell.

Another object of my invention is to provide an improved pad as aforesaid which is inexpensive in cost, which can easily be handled, and which is very efficient in use.

In accordance with my present invention, I form the pad of several laminations which include one or more sheets of cellulose acetate placed against the face of the matrix when it is being backed up. The cellulose acetate softens when heated and oozes down into the grooves in the matrix face, thereby protecting them from the damaging action of the pressure applied thereto, and since there is no hard grain or fiber structure present in the cellulose acetate, the possibility of marring the matrix face is eliminated. Also, the softened cellulose acetate works its way into the minute openings that may be present in the matrix shell and prevents the solder from running up therethrough to the face of the matrix.

Figure 2:
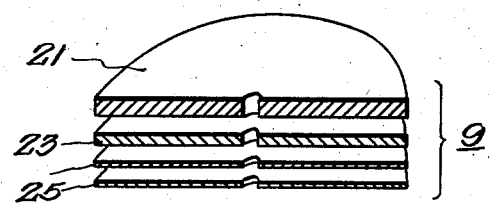

The novel features that I consider characteristic of my invention are set forth with particularity in the appended claims. The invention itself, however, both as to its organization and method of operation, together with additional objects and advantages thereof, will best be understood from the following description of one embodiment thereof, when read in connection with the accompanying drawing wherein Figure 1 is a sectional view of a press adapted for uniting the matrix shell to the backing and showing the manner in which the shell and the backing are united, and Figure 2 is a view partly in perspective and partly in section showing one form of my improved pad.

Referring more specifically to the drawing, wherein similar reference characters designate corresponding parts throughout, there is shown a heating plate 1 having an upstanding pin 3 thereon adapted to threadedly receive a matrix backing plate 5, a matrix shell 7, and a pressing pad 9. The heating plate 1 may be heated in any suitable manner, as over an open flame, with the backing plate 5 resting thereon and, when the backing plate 5 has become hot, it is tinned with a thin layer of solder 11, after which the matrix shell 7 is placed thereon with its grooved face on top. Thereafter, the pad 9 is placed over the shell 7 and a top plate 13, which may be similar to the heating plate 1, is placed on the pad 9 threaded onto the protruding end of the spindle 3. The entire assembly is then set upon the base 15 of a hydraulic press and the head 17 of the press is brought down against the top plate 13 to apply pressure to the entire assembly. In order to cool the backing plate 5, the solder 11 and the shell 7, cold water may be circulated through the coils 19 in the base 15 and the head 17 of the press.

The pad 9 is formed of a laminated structure including a preferably calendered cardboard layer 21, approximately .0075" thick, a layer of blotting paper or the like 23, approximately .002" thick, and one or more layers of cellulose acetate, each from .0008" to .001" thick. In actual practice, I have used from one to four layers of cellulose acetate and have found that excellent results may be obtained with a pad formed as above described.

Although I have shown and described but one specific embodiment of my invention, I am fully aware that many modifications thereof are possible. Any suitable material may be substituted for the layers 25 of the pad 9, providing that it softens upon heating and is free from granular or fiber structure which will leave marks on the face of the matrix shell 7, and various materials which are suitable for this purpose, will, no doubt, readily suggest themselves to those skilled in the art. It will also be apparent that my improved pad may be used not only in backing up the commercial record pressing matrices, but the master matrices and metal molds as well. I, therefore, desire that my invention shall not be limited except insofar as is made necessary by the prior art and by the spirit of the appended claims.

I claim as my invention:

1. A pad for use in applying a backing plate to a phonograph record matrix shell with the aid of pressure which comprises a plurality of sheet laminations at least one of which is constituted by cardboard, at least one other of which is constituted by blotting paper, and at least one other of which is constituted by cellulose acetate, said cardboard and cellulose acetate laminations constituting the outer layers of the pad and said blotting paper being interposed between said outer layers.

2. A pad for use in applying a backing plate to a phonograph record matrix shell with the aid of pressure which comprises a plurality of sheet laminations, one of said sheets being constituted by cardboard, another of said sheets being constituted by blotting paper, and the remaining sheets being constituted by cellulose acetate, said cardboard sheet and one of said cellulose acetate sheets constituting the outer layers of the pad and said blotting paper being interposed between said cardboard sheet and said last named cellulose acetate sheet.

3. The invention set forth in claim 2 characterized in that said blotting paper is disposed next adjacent said cardboard sheet.

4. The method of uniting to a metal backing plate a metal matrix shell having minute openings extending therethrough and having also a grooved surface and an ungrooved surface which comprises applying an adhesive coating to said plate, placing said shell on said coating with its ungrooved surface in contact with said coating, applying to the grooved surface a laminated pad which includes a relatively hard fibrous base material, an intermediate layer of relatively soft fibrous material, and a non-fibrous surface material adapted to soften up on being heated, heating said surface material to cause it to soften, and applying pressure to said backing plate, said shell and said pad whereby to cause said softened material to enter between said grooves and into said openings.

5. The method of uniting to a metal backing plate a metal matrix shell having minute openings extending therethrough and having also a grooved surface and an ungrooved surface which comprises applying an adhesive coating to said plate, placing said shell on said coating with its ungrooved surface in contact with said coating, applying to the grooved surface a laminated pad which includes a base material of calendered cardboard, an intermediate layer of blotting paper, and a surface layer of cellulose acetate, heating said surface layer to cause it to soften, and applying pressure to said backing plate, said shell and said pad whereby to cause said softened cellulose acetate to enter between said grooves and into said openings.

JAMES H. HUNTER.